United States Patent [19]
Schexnayder

[11] Patent Number: 5,717,259
[45] Date of Patent: Feb. 10, 1998

[54] ELECTROMAGNETIC MACHINE

[76] Inventor: J. Rodney Schexnayder, 6215 Fausse Bayou Dr., Ventress, La. 70783

[21] Appl. No.: 584,056

[22] Filed: Jan. 11, 1996

[51] Int. Cl.⁶ .............................. G21D 7/02; H02K 44/00
[52] U.S. Cl. .................................. 310/11; 310/46
[58] Field of Search ...................... 310/11, 46; 335/279, 335/280; 417/412; 623/3

[56] References Cited

U.S. PATENT DOCUMENTS

| | | | |
|---|---|---|---|
| 2,792,536 | 5/1957 | Immel | 335/279 |
| 2,917,599 | 12/1959 | Ovshinsky | 200/87 |
| 3,139,543 | 6/1964 | Balamuth et al. | 310/26 |
| 3,467,927 | 9/1969 | Macy | 335/296 |
| 3,577,108 | 5/1971 | Bengston et al. | 336/20 |
| 3,612,924 | 10/1971 | Semmelink | 310/26 |
| 3,677,667 | 7/1972 | Morrison | 417/474 |
| 3,750,067 | 7/1973 | Fletcher et al. | 335/296 |
| 4,053,952 | 10/1977 | Goldstein | 417/412 |
| 4,118,646 | 10/1978 | Fleming et al. | 310/58 |
| 4,217,171 | 8/1980 | Schaffer | 176/7 |
| 4,252,605 | 2/1981 | Schaffer | 176/1 |
| 4,650,485 | 3/1987 | Della Sala | 623/3 |
| 5,148,068 | 9/1992 | Kushida et al. | 310/46 |
| 5,471,185 | 11/1995 | Shea et al. | 335/51 |

FOREIGN PATENT DOCUMENTS 2133225  7/1984  United Kingdom.

OTHER PUBLICATIONS

Falko Kuhnke, et al. "Small toroidal cores are used. NASA's Jet Propulsion Laboratory, Pasadena, California" *NASA Tech Briefs*, Jun. 1995.

Max Gasser. "Compressor Has No Moving Macrosopic Parts. Slugs of magnetic powder are made alternately more and less porous to pressurize a fluid. Goddard Space Flight Center, Greenbelt, Maryland" *NASA Tech Briefs* Dec. 1995.

*Primary Examiner*—Clayton E. LaBalle
*Attorney, Agent, or Firm*—Russel O. Primeaux

[57] ABSTRACT

A electromagnetic machine is provided. The machine has a rigid elongated hollow shell, open at both ends, which is bigger at its midsection than at either end. The shell is wrapped with a wire which is connected to a power source so that the device can be energized. A pliable elongated pouch is at least partially within the shell and the two ends of the pouch protrude from the open ends of the shell. Magnetizable particles are contained within the pouch. When current is flowed through the wire, the particles are attracted radially outward at the biggest section of the shell. As the particles move they deform the pouch and the two ends of the pouch are brought closer together. Work can be performed by attaching objects to the two ends of the pouch.

12 Claims, 7 Drawing Sheets

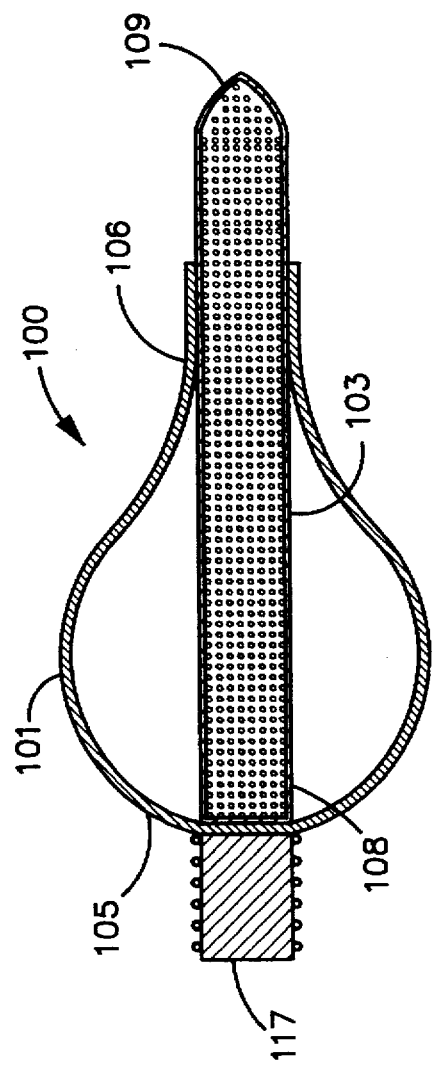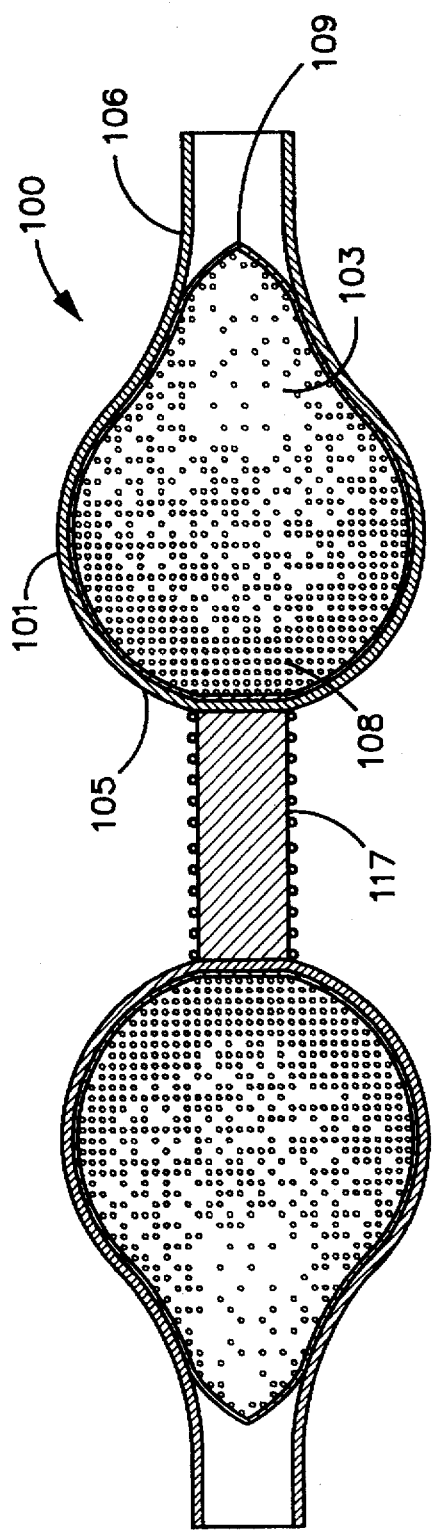

ELECTROMAGNETIC MACHINE

BACKGROUND OF THE INVENTION

As various applications for automation and machinery arise, machinery is developed to meet the needs of the particular application. Recently there has been an increase in the need for machinery which is small in scale. Small scale and miniature machinery must be simple and reliable. Shortfalls of machinery include the number of moving parts which can breakdown and lubrication. Problems specific to miniature machinery include the difficulty of lubricating on a small scale and the difficulty of adapting conventional size machines to a smaller scale.

Another need exists for machinery of any size which can exhibit a fine degree of adjustment. In many control system applications accuracy of movement is crucial and simple on-off controls will not suffice.

It is also desirable that any machine, whatever its size, be efficient and require little or no maintenance.

1. Field of the Invention

This invention relates, generally, to devices which use electromagnetic force to do work, and particularly, to devices which use electromagnetic force to move magnetically permeable particles, using the movement of those particles to do work.

2. Prior Art

Electromagnetic force has been used in a variety of applications. It is used in conventional electric motors which use electromagnetic energy to rotate a shaft. Electromagnetic energy is used in conventional solenoids in which a hollow cylinder with a wire wrapping is used to move a rod disposed within the cylinder. Electromagnetic force has also been used in more complex applications to trigger implosion in nuclear devices. Electromagnetic forces are used in numerous variations in audio applications such as electro-acoustic drivers. However, none of these applications uses the electromagnetic force in a way which is simple, efficient, and controllable to the degree desired.

OBJECTS OF THE INVENTION

It is an object of the present invention to provide an electromagnetic machine which is simple and requires little or no maintenance.

Another object of the present invention is to provide an electromagnetic machine which can be made in a small model suitable for micro-machinery applications.

Another object of the present invention is to provide a machine which needs only an electric current as its power source.

Another object of the present invention is to provide a machine with an extremely fine degree of adjustment.

SUMMARY OF THE INVENTION

An electromagnetic machine is provided. The machine has an elongated shell with a wire wrapping. Inside the shell is a pliable elongated containment member which contains magnetizable particles. The shell can be open at both ends or can be closed at one end and open at the other. In the double open end embodiment each end of the containment member is attached to two objects to be brought together. In the single open end embodiment one end of the containment member is attached to one end of the shell and the other end of the containment member is attached to an object to be moved.

A feature of the invention is that it is adaptable to many applications such as biomechanical devices, mechanical control systems, robotic systems, and switching systems. The biomechanical applications of the machine include use in artificial organs and muscle and joint prostheses.

These and other objects, advantages, and features of this invention will be apparent from the following description of the invention.

BRIEF DESCRIPTION OF THE DRAWINGS

FIG. 5A is a sectional view of the end magnet embodiment of the invention.

FIG. 5B is a sectional view of a paired version of the end magnet embodiment of the invention.

DETAILED DESCRIPTION OF THE PREFERRED EMBODIMENTS

Figure 1A:
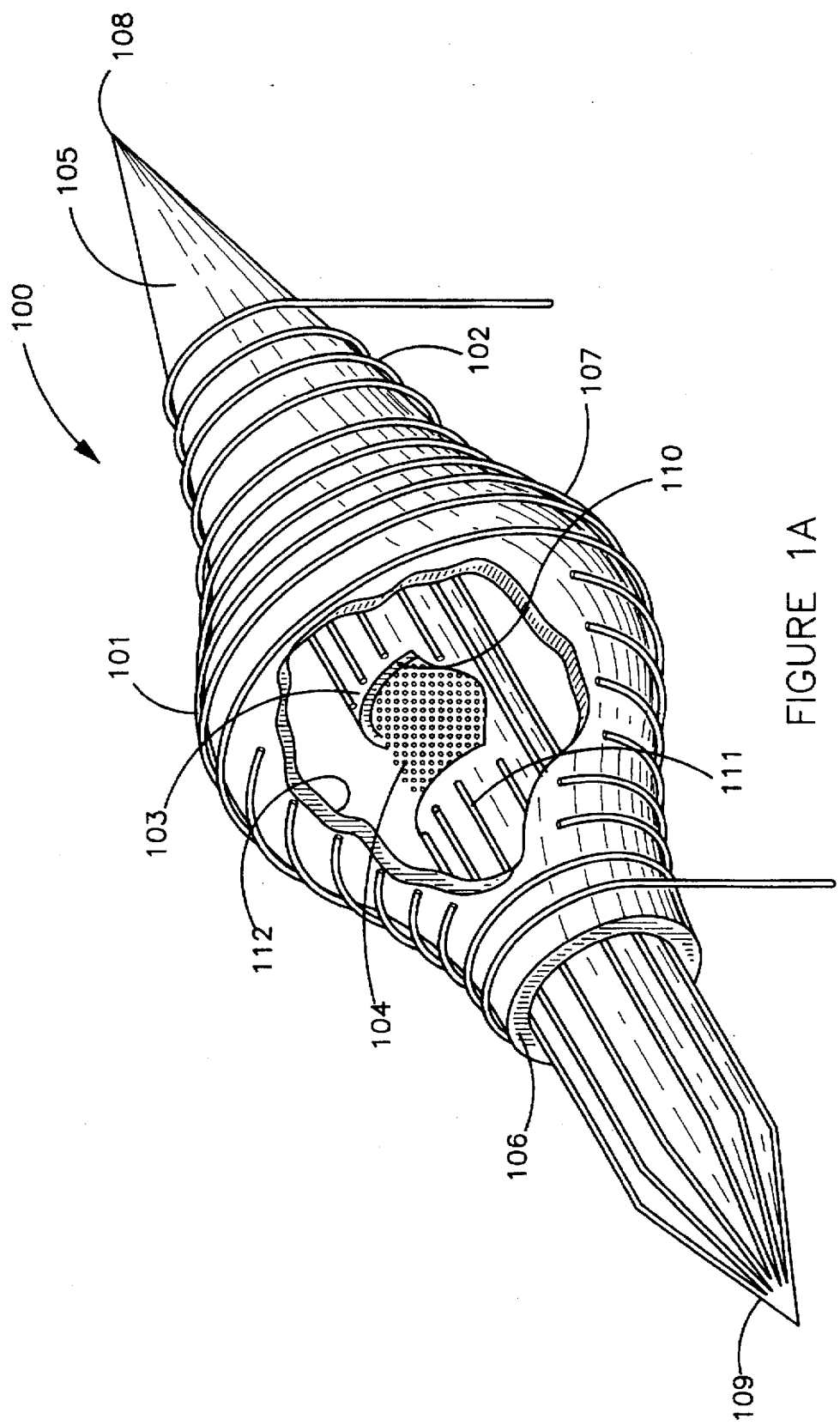
FIG. 1A is a perspective view of the single open end embodiment of the invention.

Referring to FIG. 1A, the single open end embodiment of the invention is shown. Generally, electromagnetic machine 100 has single open end shell 101, conductor 102, containment member 103, and particles 104. Single open end shell 101 is an elongated hollow member, preferably constructed of highly permeable material. Preferably, single open shell 101 will also be rigid or semi-rigid, so that it retains its shape as the particles 104 are attracted toward it when electromagnet machine 100 is energized. In the embodiment depicted in FIG. 1A, single open end shell 101 is constructed of a molded plastic, but one skilled in the art could construct single open end shell 101 of any material providing the desired qualities.

Single open end shell 101 has closed shell end 105 and open shell end 106. Single open end shell 101 is constructed so that it has at least one expanded portion 107 between closed shell end 105 and open shell end 106. Expanded portion 107 is constructed so that it has the largest cross-section of single open end shell 101. In the embodiment depicted in FIG. 1, single open end shell 101 has only one such expanded portion 107. However, shell 101 could be constructed with multiple expanded portions 107.

Conductor 102 is wrapped around single open shell 101. Alternatively, one skilled in the art could imbed conductor 102 in single open end shell 101, or even attach conductor 102 to inner surface 112 of single open end shell 101. Conductor 102 is connected to a current source (not shown). Conductor 102 may be wrapped in a spiral configuration as shown in FIG. 1A. It is not necessary that conductor 102 be in contact with single open end shell 101. One could also practice the invention with conductor 102 in close proximity with single open end shell 101.

Although it is preferred that single open shell 101 be rigid or semi-rigid, one could construct electromagnet machine 100 so that conductor 102 is, for example, a rigid wire, and single open shell 101 is a pliable member contained within the wire. In such a construction, particles 104 would be contained by the pliable shell as particles 104 are attracted outward to the wire.

The number of turns conductor 102 makes around single open end shell 101 can be varied as desired for particular applications. For a constant current through conductor 102, a greater number of turns will increase the strength of the electromagnetic field generated by conductor 102. Although conductor 102 is shown wrapped around the entirety of single open end shell 101, one could vary the location of the wrapping of conductor 102. For the embodiment of electromagnetic machine 100 depicted in FIG. 1A, all wrappings of conductor 102 except for those on expanded portion 107 could be eliminated and electromagnetic machine 100 would still function.

Containment member 103 is a flexible and pliable closed member which must be at least partially disposed within single open end shell 101. For the embodiment shown in FIG. 1A, containment member 103 has two ends, fixed end 108 and free end 109. Fixed end 108 is attached to single open end shell 101 at closed shell end 105. Free end 109 will be attached to the load or object (not shown) which is being moved by electromagnetic machine 100. Containment member 103 is comprised of liner 110 and a plurality of reinforcing members 111.

Reinforcing members 111 extend linearly and connect fixed end 108 to free end 109. In the embodiment shown liner 110 is constructed of cloth fabric but one skilled in the art could construct liner 110 of any flexible and pliable material capable of containing particles 104. Reinforcing members 111 could run linearly as shown in FIG. 1A, could run in a cross weave pattern, or could even be eliminated entirely in certain applications if the load were light enough. Preferably, reinforcing members 111 are constructed of wire or synthetic string, but any materials which provide the tensile strength necessary can be used. Reinforcing members 111 may be integrated into the structure of liner 110 or they can be separate from and outside of liner 110.

Figure 1B:
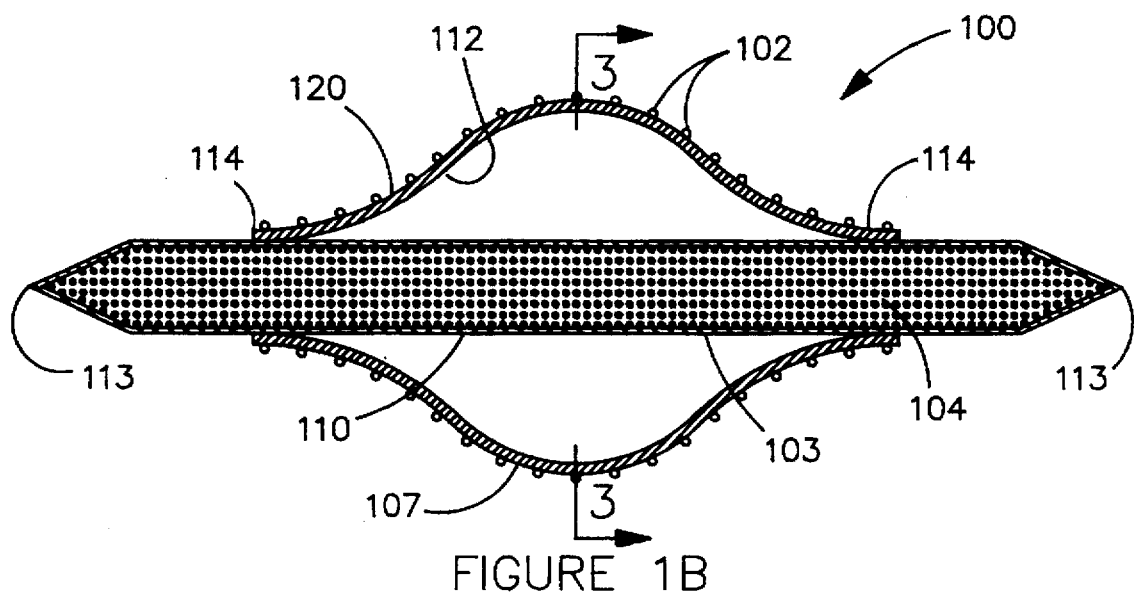
FIG. 1B is a perspective view of the double open end embodiment of the invention. The machine is shown at rest, nonenergized.

FIG. 1B depicts the double open end embodiment of electromagnetic machine 100. The components are generally the same as those of the single open end embodiment. Electromagnetic machine 100 has double open end shell 120, conductor 102, containment member 103, and particles 104. Double open end shell 120 has shell ends 114 and may be constructed of the same materials discussed for single open end shell 101 above. As described for the single open end embodiment, double open end shell 120 for the double open end embodiment will be constructed similarly so that it has at least one expanded portion 107 between its two shell ends 114.

The double open end embodiment will also have conductor 102 wrapped around double open end shell 120. For the double open end embodiment, containment member 103 will be a flexible, pliable, elongated closed member which must be at least partially disposed within double open end shell 120. For the embodiment shown in FIG. 1B, containment member 103 has containment member ends 113 which may be attached to the objects which are to be brought together. Containment member 103 is again constructed so that it has liner 110 and a plurality of reinforcing members 111.

Figure 3:
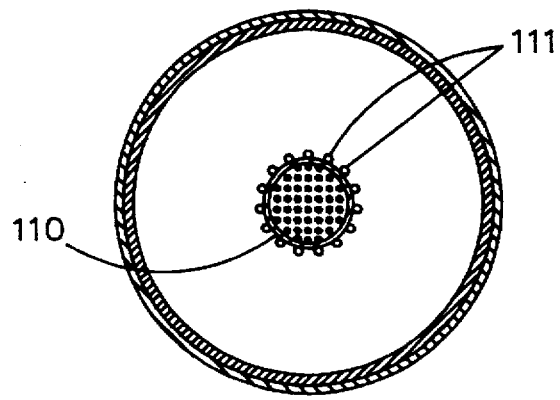
FIG. 3 is a sectional view of the embodiment depicted in FIG. 1A.

FIG. 3 is a sectional view of the embodiment shown in FIG. 1B. Shown are double open end shell 120, containment member 103, and particles 104. In the embodiment shown in FIG. 3, reinforcing members 111 are integrated into liner 110.

Figure 2:
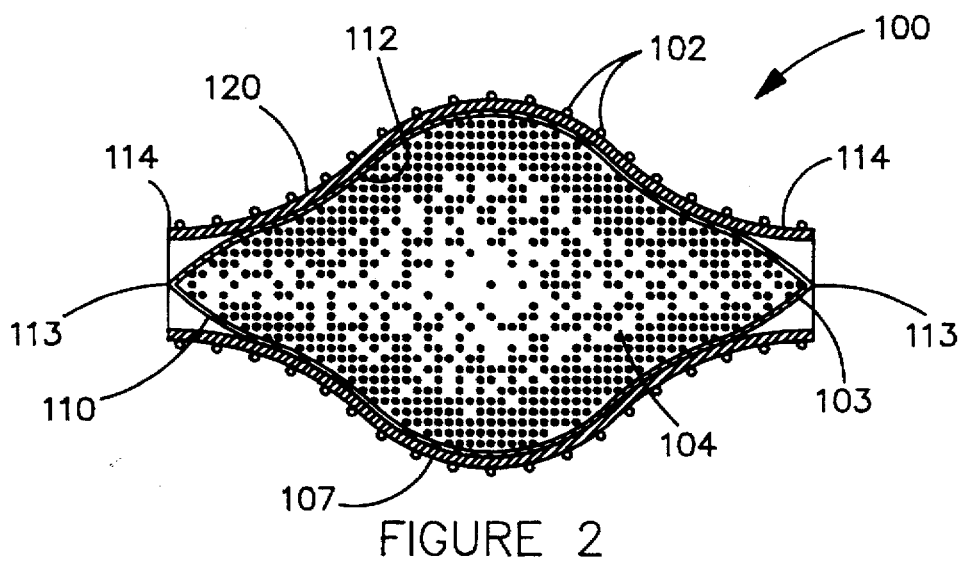
FIG. 2 is a perspective view of the double open end embodiment of the invention. The machine is shown in contraction, energized.

FIG. 2 depicts the double open end embodiment of electromagnetic machine 100 of FIG. 1B in contraction. When current is supplied to conductor 102 an electromagnetic field is created around conductor 102. The electromagnetic force attracts particles 104 to inner surface 112 of double open end shell 120. As particles 104 move to inner surface 112, containment member 103 is also moved toward, and eventually into contact with, inner surface 112. As containment member 103 is moved toward inner surface 112, Distance C between containment member ends 113 decreases.

As the current is increased Distance C is decreased. Electromagnetic machine 100 may also be biased with a spring or other biasing means so that when the current is decreased Distance C will again increase. Preferably particles 104 are spherically shaped and sized small enough so that the movement of particles 104 will be smooth. Depending on the intended application of electromagnetic machine 100, particles 104 are of varying permeability. In most applications particles of high permeability will be used.

It should also be noted that one skilled in the art could practice the invention of electromagnetic machine 100 with approximately ½ of the machine shown in FIGS. 1A and 1B. In such an embodiment only the part of the machine above line A—A of FIGS. 1A or 1B would be necessary. Where the device was cut in half, a planar section of the same material used in shell 101 would complete the cut shell.

Figure 4:
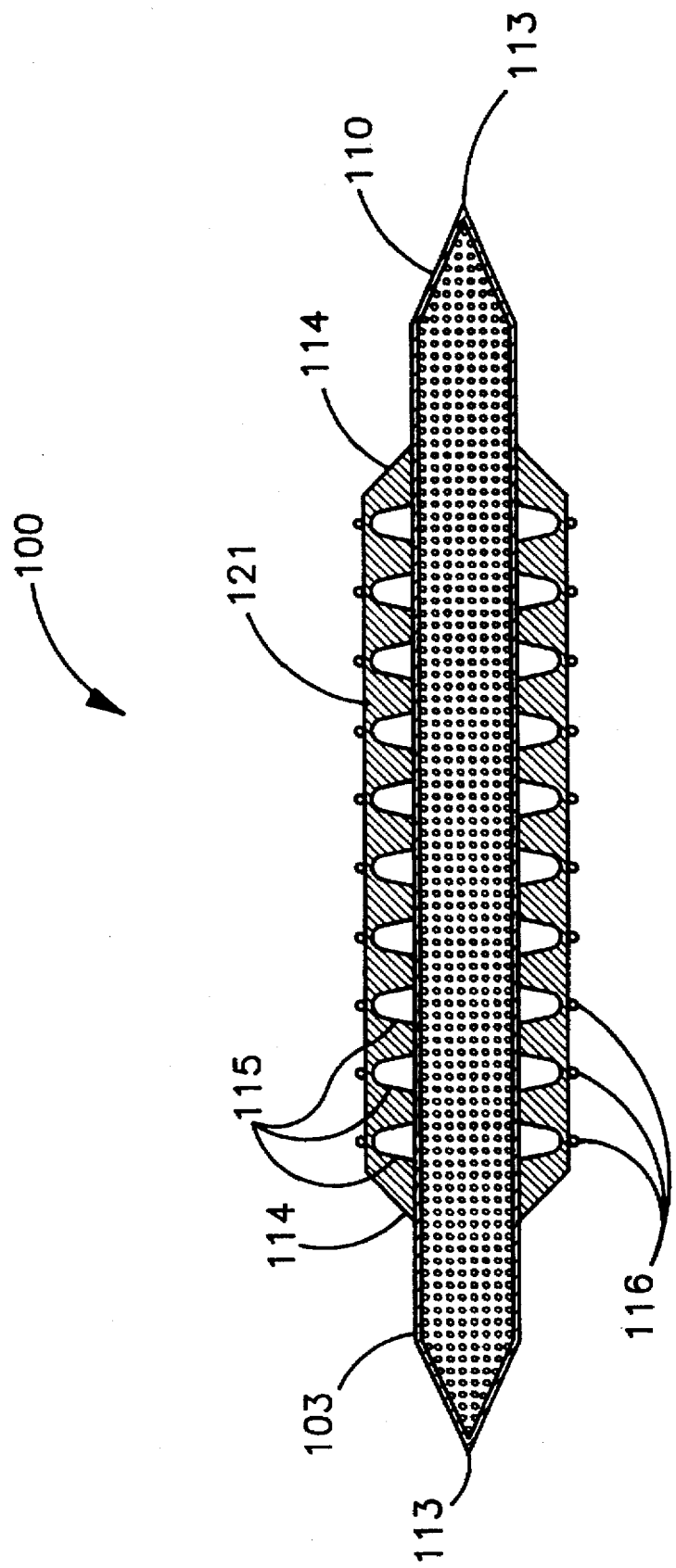
FIG. 4 is a sectional view of the multi-chamber embodiment of the invention.

FIG. 4 is a sectional view of a multi-chamber embodiment of electromagnetic machine 100. Electromagnetic machine 100 will have multi-chamber shell 121 with ends 114. Multi-chamber shell 121 is constructed of the same materials used for the shell in the previously described embodiments. Multi-chamber shell 121 can be designed to be open at both ends 114 as depicted or one skilled in the art could design the multi-chamber embodiment to be closed at one end. Multi-chamber shell 121 has two or more chambers 115. Preferably, each chamber 115 will be constructed so that its cross-section is elliptical or semi-circular in shape but the chambers may be of any cross-sectional shape so long as they open radially inward.

As with the single chamber embodiment, the multi-chamber embodiment of electromagnet machine 100 has containment member 103 which is at least partially disposed within multi-chamber shell 121. Containment member 103 is constructed with just liner 110 or with liner 110 and reinforcing members 111. Contained within liner 110 are magnetically permeable particles 104.

The use of multiple chambers 115 means that the difference between Distance F, the distance between containment member ends 114, when electromagnetic machine 100 is at rest and Distance F when electromagnetic machine 100 is fully energized, will be greater than if only a single chamber of similar size were used. This greater contraction ability is achieved by increasing the deviation of liner 110 from the straight line between shell ends 114.

In a particularly preferred embodiment conductor 102 will have be divided into conductor chamber portions 116. Each conductor chamber portion 116 is located adjacent to and immediately radially outward from each chamber 115. Each conductor chamber portion 116 is connected to a current source. One could flow current through all conductor chamber portions 116 and vary the amount of that current. Alternatively, electromagnetic machine 100 could be designed so that the current to each conductor chamber portion 116 could be separately controlled. An advantage of such a configuration is the precise incremental adjustment control which would be available.

FIG. 5A depicts an end magnet embodiment of electromagnetic machine 100. The end magnet embodiment includes electromagnet 117, single open end shell 101, containment member 103, and particles 104. Single open end shell 101 has closed shell end 105 and open shell end 106. Containment member has fixed end 108 and free end 109. The end magnet embodiment of FIG. 5 works in a similar manner to the single open end embodiment except that particles 104 are attracted to electromagnet 117 at closed shell end 105 instead of being attracted radially outward. However, the result is the same in that particles 104 will begin to displace containment member 103 radially outward and free end 109 will be drawn toward fixed end 108.

Electromagnet 117 is a simple electromagnet consisting of a high permeability bar or rod, wrapped with wire, and connected to a current source. Electromagnet 117 should be located immediately adjacent to closed shell end 105 or at least close enough so that electromagnet 117, when energized, will attract particles 104.

As shown in FIG. 5B, a pair of the end magnet embodiments may be connected to form a single electromagnetic machine 100. In such a configuration, a single electromagnet 117 can serve as the electromagnet for both single open end shells 101.

Figure 6:
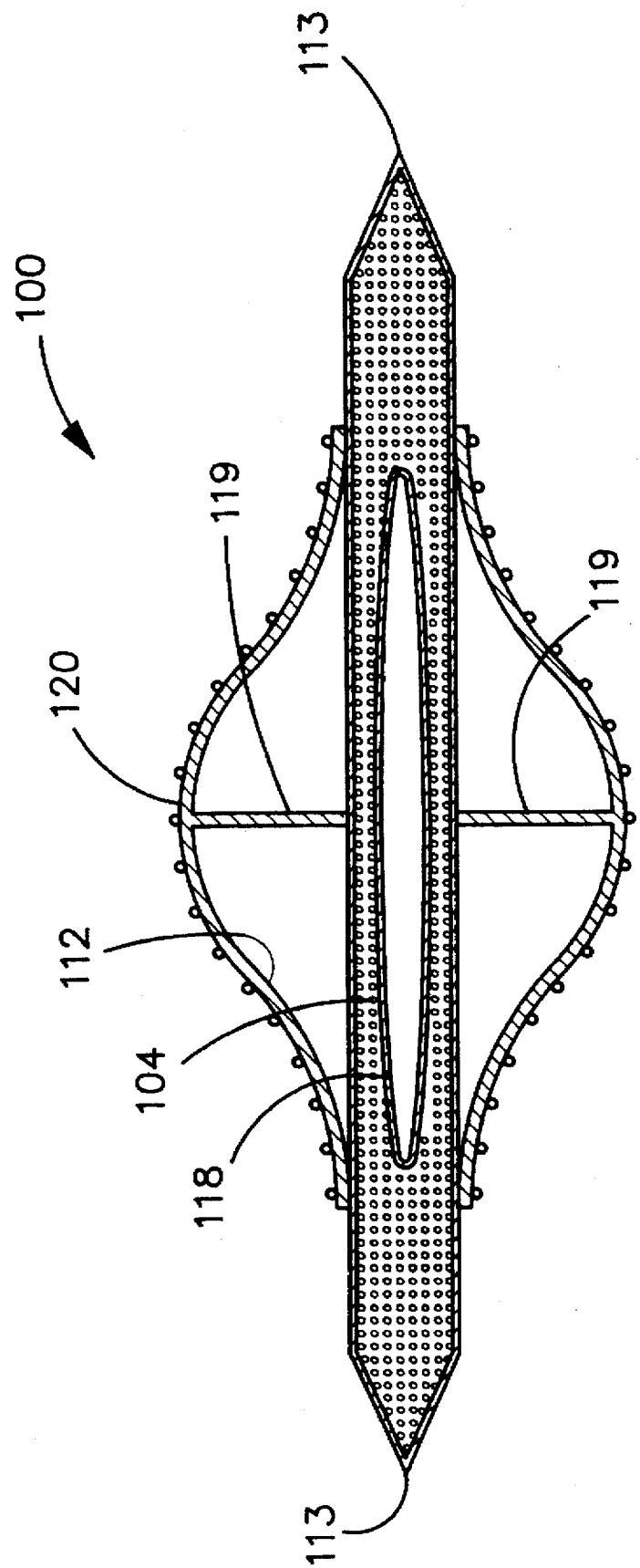
FIG. 6 is a sectional view of the double open end device with a spacing chamber.

FIG. 6 depicts a double open end embodiment of electromagnetic machine 100 which includes spacing chamber 118. Spacing chamber 118 is a hollow elongated member disposed within double open end shell 120 so that the long axis of spacing chamber 118 is the same as the long axis of double open end shell 120. Spacing chamber 118 may be constructed of the same materials used for the shell in the previously described embodiments. Spacing chamber 118 is held in place within double open end shell 120 by support members 119. Support members 119 are rigid members of non-magnetizable materials which are attached at one end to a spacing chamber 118 and at the other end to inner surface 112 of double open end shell 120.

Spacing chamber 118 allows electromagnetic machine 100 to function while lessening the total volume and total number of particles 104 needed. Although spacing chamber 118 is only described and depicted for the double open end embodiment, spacing chamber 118 could also be used in the other embodiments described herein.

Figure 7:
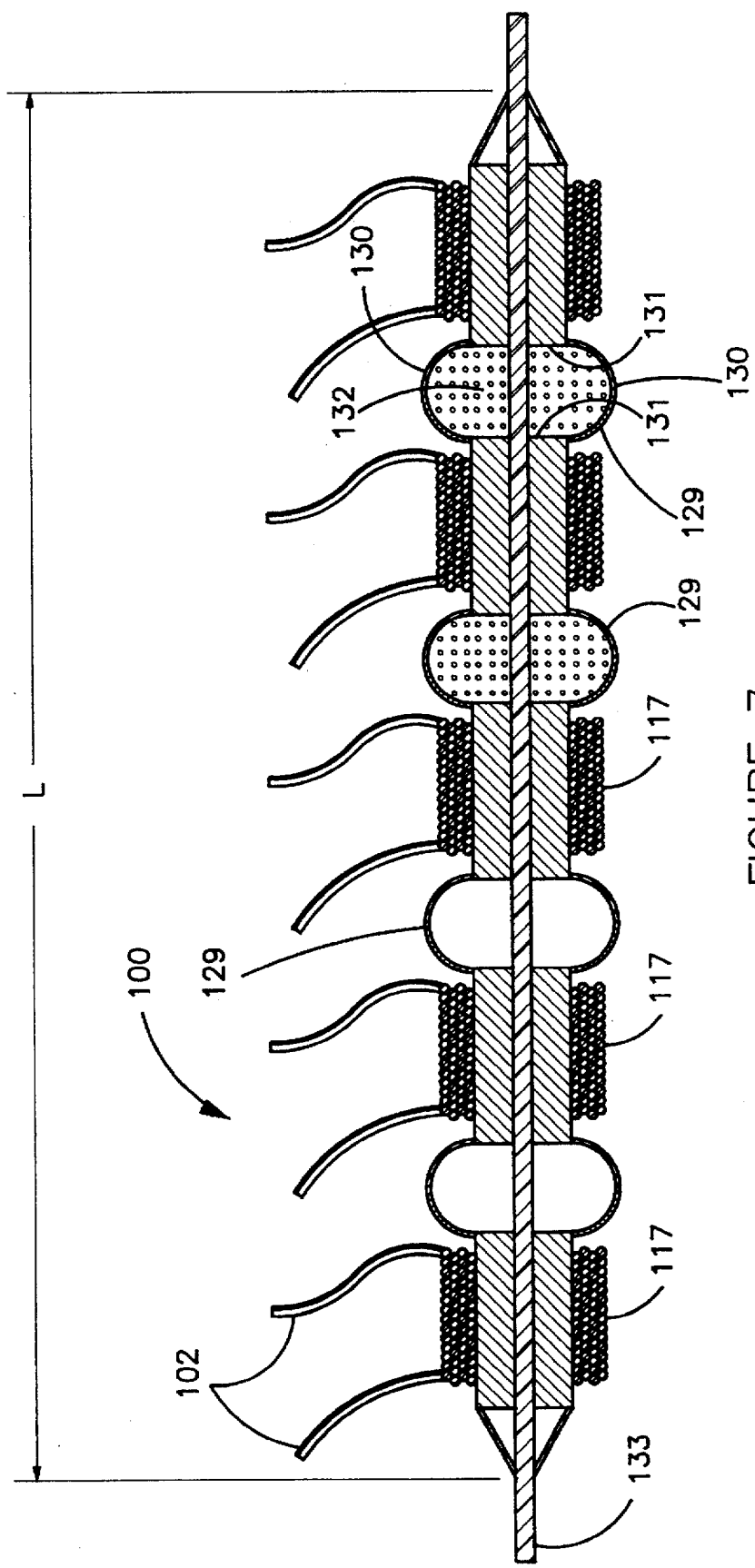
FIG. 7 is a sectional view of the collapsible embodiment of the invention.

The collapsible embodiment of electromagnetic machine 100 is shown in FIG. 7. Shown are electromagnets 117, which are constructed similarly to electromagnet 117 used in the end magnet embodiments shown in FIGS. 5A and 5B. Electromagnets 117 are oriented so that the north pole of one magnet is adjacent to the south pole of the next magnet in the sequence. Each electromagnet 117 will be supplied with current via conductors 102. Collapsible chambers 129 connect and separate adjacent electromagnets 117. Collapsible chambers 129 are formed by deformable sidewalls 130 and magnet surfaces 131. Sidewalls 130 are constructed so as to be elastic, resilient, and capable of containing fluid or gas which may be contained within collapsible chambers 129.

When electromagnets 117 are energized by flowing current through conductor 102, electromagnets 117 will be drawn toward one another, causing sidewalls 130 to bulge outward. Collapsible chambers 129 can contain a fluid or gas or can contain non-magnetizable particles 132. Collapsible chambers 129 serve as a buffer between electromagnets 117 and allow the collapsible embodiment to operate smoothly and with an infinite degree of adjustment. As current is increased through conductor 102, the force attracting electromagnets 117 to one another will become greater and distance "L" will decrease.

Although in the embodiment depicted in FIG. 7 electromagnets 117 and collapsible chambers 129 are disposed along a rod, one skilled in the art may practice the invention without a rod. FIG. 7 shows cylindrical electromagnets however, one could practice the invention with electromagnets of various shapes.

Figure 8:
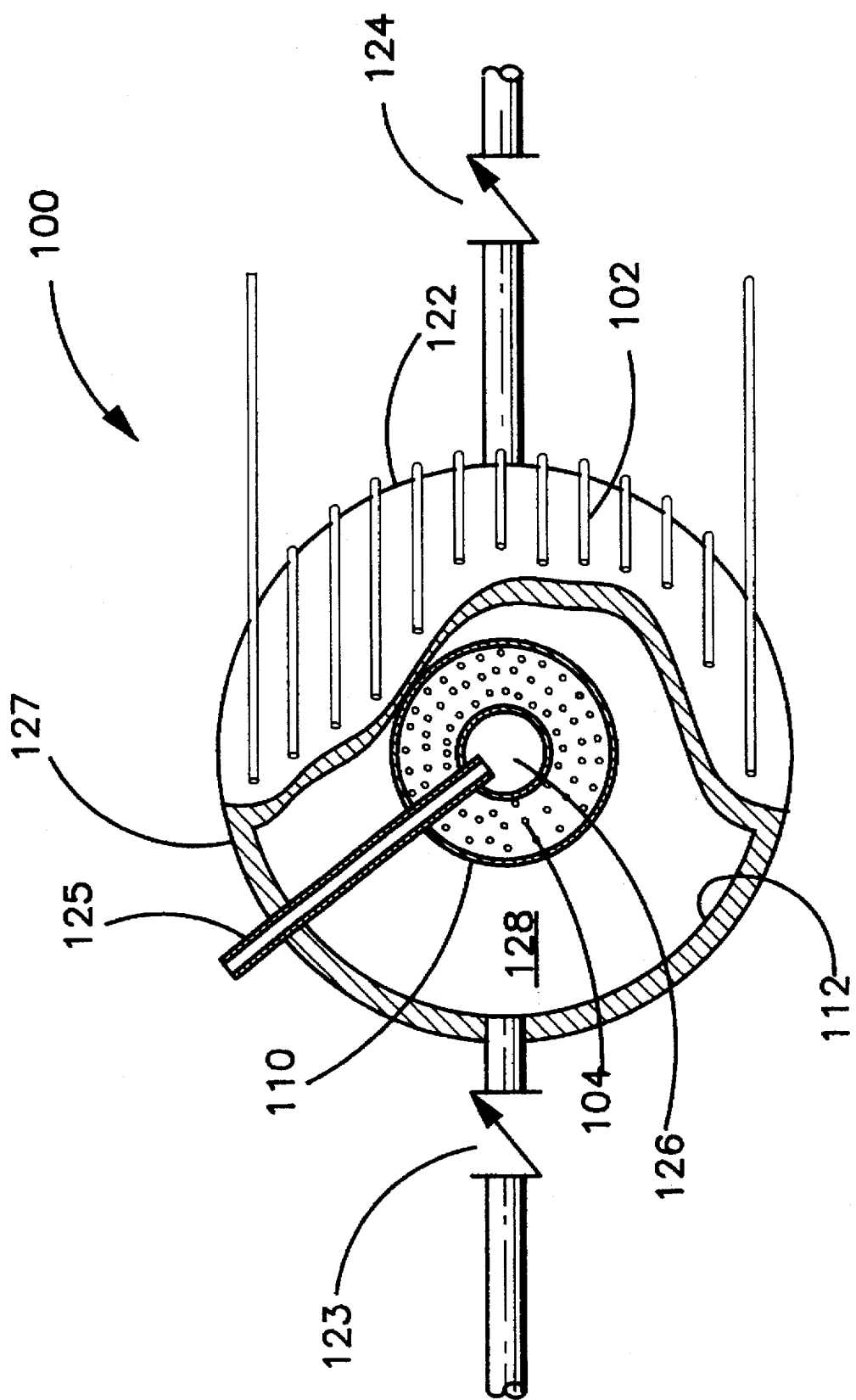
FIG. 8 is a cut-away view of the pump embodiment of the invention.

FIG. 8 depicts the pump embodiment of electromagnetic machine 100. Pump 127 will include pump shell 122 which is depicted as spherical but may be of many different shapes. Disposed within pump shell 122 is liner 110 which will contain particles 104. Inside liner 110 is an optional inner pump chamber 126. Inner pump chamber 126 is a pliable elastic member which can expand and contract as particles 104 are drawn toward inner surface 112. Optional vent 125 will allow inner pump chamber 126 to more easily expand as conductor 102 of pump 127 is energized. Vent 125 is depicted as a tube which allows the equalization of pressure between inner pump chamber 126 and the external environment.

Pump 127 also includes inlet valve 123 and outlet valve 124, each of which can be simple one-way directional valves. As pump 127 is energized liner 110 is moved toward inner surface 112, thereby decreasing the volume of fluid chamber 128. As the volume of fluid chamber 128 decreases, inlet valve 123 will close and outlet valve 124 will open, allowing the fluid in fluid chamber 128 to escape. As the pump is de-energized liner 110 will return to the at rest position shown in FIG. 8, thereby increasing the volume of fluid chamber 128. The corresponding decrease in pressure in fluid chamber 128 will cause outlet valve 124 to close and inlet valve 123 to open, and the fluid to be pumped will be flowed into fluid chamber 128.

The device has numerous applications. It can be used in prosthetic applications as an artificial muscle or in artificial organs. It can be used as a simple machine to lift or move objects or to bring objects together. The device can be used in control systems—for example, it can be used to operate a valve. The device can also be used for mechanical or electronic switching.

There are of course other alternate embodiments which are obvious from the foregoing descriptions of the invention, which are intended to be included within the scope of the invention, as defined by the following claims.

I claim:

1. An electromagnetic machine comprising:
   (1) an elongated shell with two shell ends, open on at least one shell end, said shell having an expanded portion between said shell ends;
   (2) a conductor in proximity with said shell, said conductor being connected to a current source;
   (3) a flexible closed elongated containment member at least partially disposed within said shell, said containment member having two containment member ends, said containment member comprising a liner; and
   (4) a plurality of magnetically permeable particles, said particles being contained within said containment member, said particles, said containment member, and said shell being adapted such that when current is flowed through said conductor, said containment member liner is moved toward shell and the distance between said containment member ends is lessened.

2. The apparatus in claim 1, wherein said containment member further comprises a plurality of reinforcing members connecting said containment member ends.

3. The apparatus in claim 2, further comprising: a spacing chamber, said spacing chamber being an elongated closed member disposed within said shell and said containment member, said spacing chamber being adapted such that said spacing chamber reduces the volume of said magnetically permeable particles needed in said containment member.

4. An electromagnetic machine comprising:
   (1) an elongated shell with two shell ends, open on at least one shell end, said shell comprising a plurality of chambers, each said chamber opening radially inward from said shell;
   (2) a conductor in proximity with said shell, said conductor having a plurality of conductor chamber portions, each said conductor chamber portion corresponding to and being radially outward from each said chamber, said conductor chamber portions being connected to a current source;
   (3) a flexible closed elongated containment member at least partially disposed within said shell, said containment member having two containment member ends, said containment member comprising a liner; and
   (4) a plurality of magnetically permeable particles, said particles being contained within said containment member, said particles, said containment member, and said chambers being adapted such that when current is flowed through one or more of said conductor chamber portions, thereby energizing the chambers corresponding to said conductor chamber portions, the portion of said containment member liner immediately adjacent to the energized chambers is moved into said energized chambers toward said shell and the distance between said containment member ends is lessened.

5. The apparatus in claim 4, wherein said conductor chamber portions and said current source are adapted such that current may be selectively flowed through one or more of said conductor chamber portions.

6. The apparatus in claim 5, wherein said containment member further comprises a plurality of reinforcing members connecting said containment member ends.

7. The apparatus in claim 6, further comprising: a spacing chamber, said spacing chamber being an elongated closed member disposed within said shell and said containment member, said spacing chamber being adapted such that said spacing chamber reduces the volume of said magnetically permeable particles needed in said containment member.

8. An electromagnetic machine comprising:
   (1) an elongated shell having a closed shell end and an open shell end, said shell having an expanded portion between said closed shell end and said open shell end;
   (2) an electromagnet adjacent to said closed shell end, said electromagnet being connected to a current source,
   (3) a flexible closed elongated containment member at least partially disposed within said shell, said containment member having a fixed end attached to said shell closed end and a free end, said containment member comprising a liner; and
   (4) a plurality of magnetically permeable particles, said particles being contained within said containment member, said particles, said containment member, and said shell being adapted such that when said electromagnet is energized, said containment member liner is moved toward shell and said free end of said containment member moves toward said closed end of said shell.

9. The apparatus in claim 8, wherein said containment member further comprises a plurality of reinforcing members connecting said fixed end and said free end.

10. The apparatus in claim 9, further comprising: a spacing chamber, said spacing chamber being an elongated closed member disposed within said shell and said containment member, said spacing chamber being adapted such that said spacing chamber reduces the volume of said magnetically permeable particles needed in said containment member.

11. An electromagnetic pump comprising:
   (1) a pump shell having an inner surface,
   (2) a flexible liner disposed within said pump shell, said liner and said pump shell forming a fluid chamber between said liner and said inner surface of said pump shell;
   (3) an inner pump chamber wholly disposed with said liner;
   (4) a plurality of magnetically permeable particles, said particles being contained within said liner but not within said inner pump chamber;
   (4) a conductor in close proximity with said shell, said conductor being connected to a current source;
   (5) an inlet valve, said inlet valve being adapted such that fluid can flow from said inlet valve into said fluid chamber; and
   (6) an outlet valve, said outlet valve being adapted such that fluid can flow from said fluid chamber through said outlet valve.

12. The apparatus in claim 11, further comprising a vent; said vent comprising a tube which is adapted such that the pressure between said inner pump chamber and the environment outside of said pump shell may be equalized.

* * * * *